United States Patent [19]
Joh

[11] Patent Number: 5,208,116
[45] Date of Patent: May 4, 1993

[54] BATTERY LOCKING APPARATUS FOR PORTABLE PERSONAL COMPUTER

[75] Inventor: Deok-Soon Joh, Suwon, Rep. of Korea

[73] Assignee: Samsung Electronics Co., Ltd., Kyunggi, Rep. of Korea

[21] Appl. No.: 815,142

[22] Filed: Dec. 31, 1991

[51] Int. Cl.⁵ .............................................. H01M 2/10
[52] U.S. Cl. ........................................ 429/96; 429/98; 429/100; 429/123
[58] Field of Search .................... 429/96, 98, 100, 123

[56] References Cited

U.S. PATENT DOCUMENTS 5,019,465  5/1992  Herron et al. ........................ 429/97
5,107,401  4/1992  Youn .................................... 361/393

FOREIGN PATENT DOCUMENTS 6035264  10/1982  Japan .

Primary Examiner—Olik Chaudhuri
Assistant Examiner—M. Nuzzolillo
Attorney, Agent, or Firm—Cushman Darby & Cushman

[57] ABSTRACT

A battery locking apparatus comprising a channel formed at a bottom surface of a battery receiving cavity of the personnal computer main body, a battery locking means disposed slidably therein and a spring member, wherein the locking means includes a movable body with a strut for supporting the spring member, a knob united with the body, a protrusion formed at the top surface of the knob, and a pair of supporting members respectively provided at both sides of the body to retain the locking means in the channel. A battery housing adapted to the battery locking apparatus comprises a right-angled triangular segment formed at the bottom surface thereof. As the battery is inserted into the cavity, the protrusion contacts with the segment to be moved along the oblique side of the segment, whereby the locking means is caused to move against the spring force from the locking position to the releasing position, which allows the battery to be received in the cavity. As the base of the segment is passed the protrusion, the locking means returns to the original locking position to hold the inserted battery in the cavity.

3 Claims, 4 Drawing Sheets

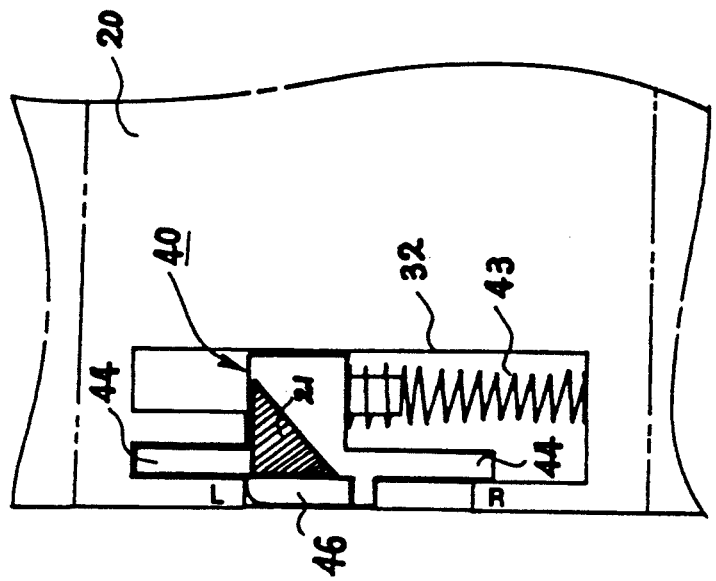
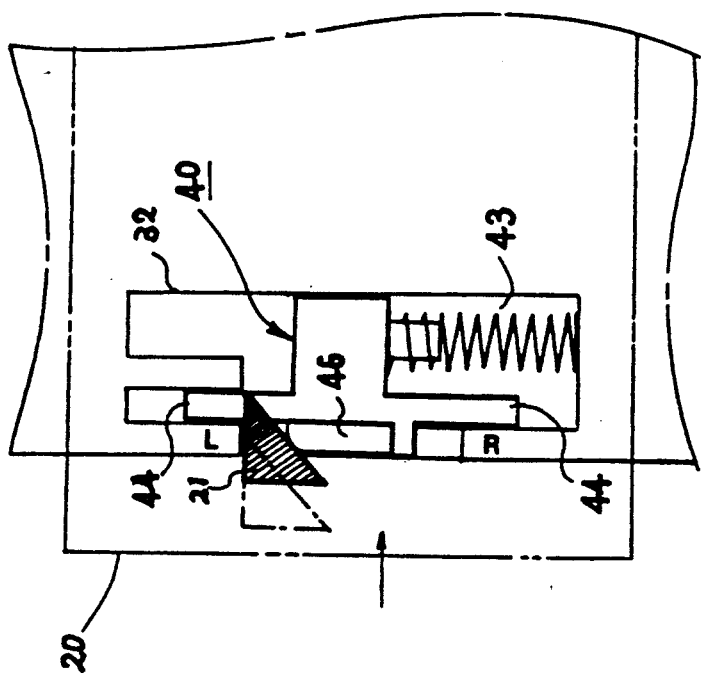

BATTERY LOCKING APPARATUS FOR PORTABLE PERSONAL COMPUTER

BACKGROUND OF THE INVENTION

The present invention relates to a battery locking apparatus for portable personal computer (PC) such as note-type PC and a battery housing adapted to the battery locking apparatus.

Conventionally, such as portable PC includes a PC main body, a key board incorporated therein, and a monitor such as liquid crystal display (LCD) integrally mounted on the PC main body. The portable PC typically needs an external power source or a battery insertable into the PC main body.

Referring to FIG. 1, there is illustrated a conventional battery locking apparatus adapted to the note-type portable PC. The locking apparatus is provided at a portion of side walls 1 defining a battery receiving cavity 2 of the PC main body. The locking apparatus includes a housing 3, a locking member 4, which is movable in the housing 3, having a stud 5 at the front end thereof, a rod 6 for guiding the movement of the locking member 4, and a compression spring 7 provided around the rod 6 to act against the backward movement of the locking member 4, thereby causing the locking member 4 to be urged forward so that the stud 5 projects into the cavity 2. A conventional battery 8 for portable PC has a recess 9 corresponding to the stud 5. As the battery 8 is pushed into the receiving cavity 2, the projected stud 5 is pressed by the battery surface to move the locking member 4 backward against the force of the spring 7. When the recess 9 of the battery 8 comes to face the stud 5, the stud 5 is inserted into the recess 9 to hold the battery 8 in the cavity 2 of the PC main body. To release the battery 8 from the cavity 2, the user moves backward the locking member 4 with a protruded portion 10 so that the stud 5 comes out the recess 9. Then, the battery 8 is released from the cavity 2 of the PC main body.

However, such conventional locking apparatus occupies an available space for a printed-circuit-board in the portable PC, which is an obstacle to compaction of the portable PC.

SUMMARY OF THE INVENTION

It is an object of the present invention to provide a battery locking apparatus for compaction of a portable personal computer (PC). Another object of the present invention is to provide a battery housing adapted to the battery locking apparatus according to the present invention.

In order to accomplish the above objects, in accordance with the present invention, there is provided a battery locking apparatus for portable PC, comprising a channel formed at a bottom surface of the battery receiving cavity of the portable PC main body, a battery locking means slidably disposed between the locking and releasing positions in the channel, a spring member provided in the channel for resilient movement of the battery locking means, wherein the battery locking means includes a movable body disposed in the channel, having a strut which supports the spring member, an outwardly exposed knob united with the body, a protrusion formed at a top surface of the knob, and a pair of supporting members provided at both sides of the body to retain the locking means in the channel. Also according to the present invention, there is provided a battery housing adapted to the battery locking apparatus of the present invention, including a right-angled triangular segment formed at the bottom surface thereof, which cooperates with the protrusion of the knob to lock the battery in the receiving cavity.

The above objects and advantages according to the present invention will be apparent upon consideration of the specification, claims and drawings.

BRIEF DESCRIPTION OF THE DRAWINGS

FIGS. 6(a) and 6(b) illustrate the battery locking means cooperating with the segment of the battery housing when the battery is inserted into the battery receiving cavity.

DESCRIPTION OF THE PREFERRED EMBODIMENT

Figure 1:
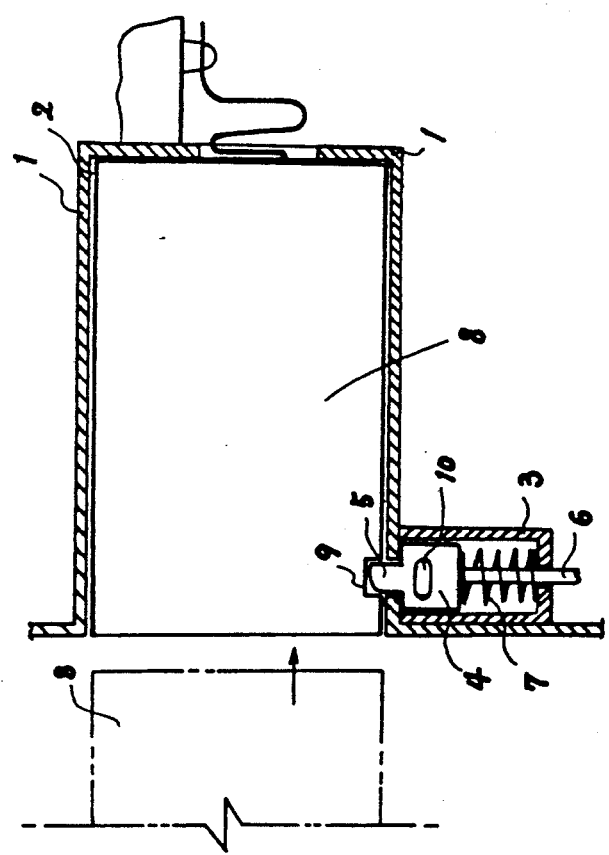
FIG. 1 is a cross-sectional view of the conventional battery locking apparatus with the battery received in the receiving cavity.
Figure 2:
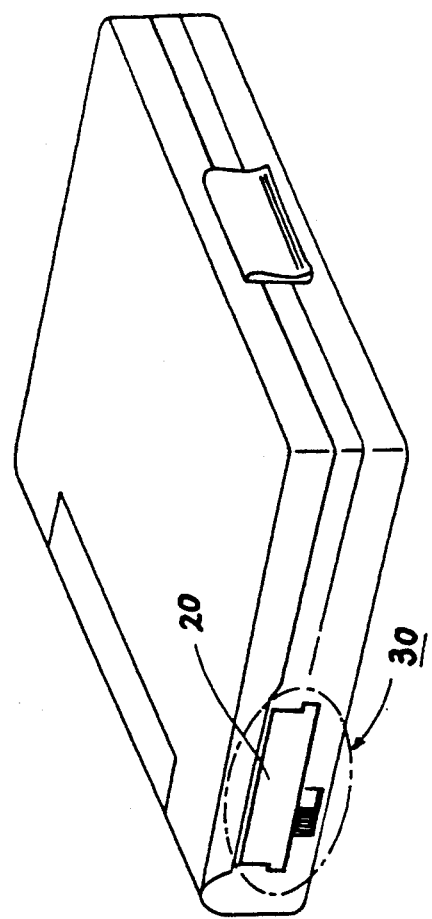
FIG. 2 is a perspective view showing a portable PC which has a battery locking apparatus according to the present invention.

FIG. 2 shows a portable personal computer (PC) that a battery is held in a battery receiving portion 30 which employes a battery locking apparatus in accordance with the present invention.

Figure 3:
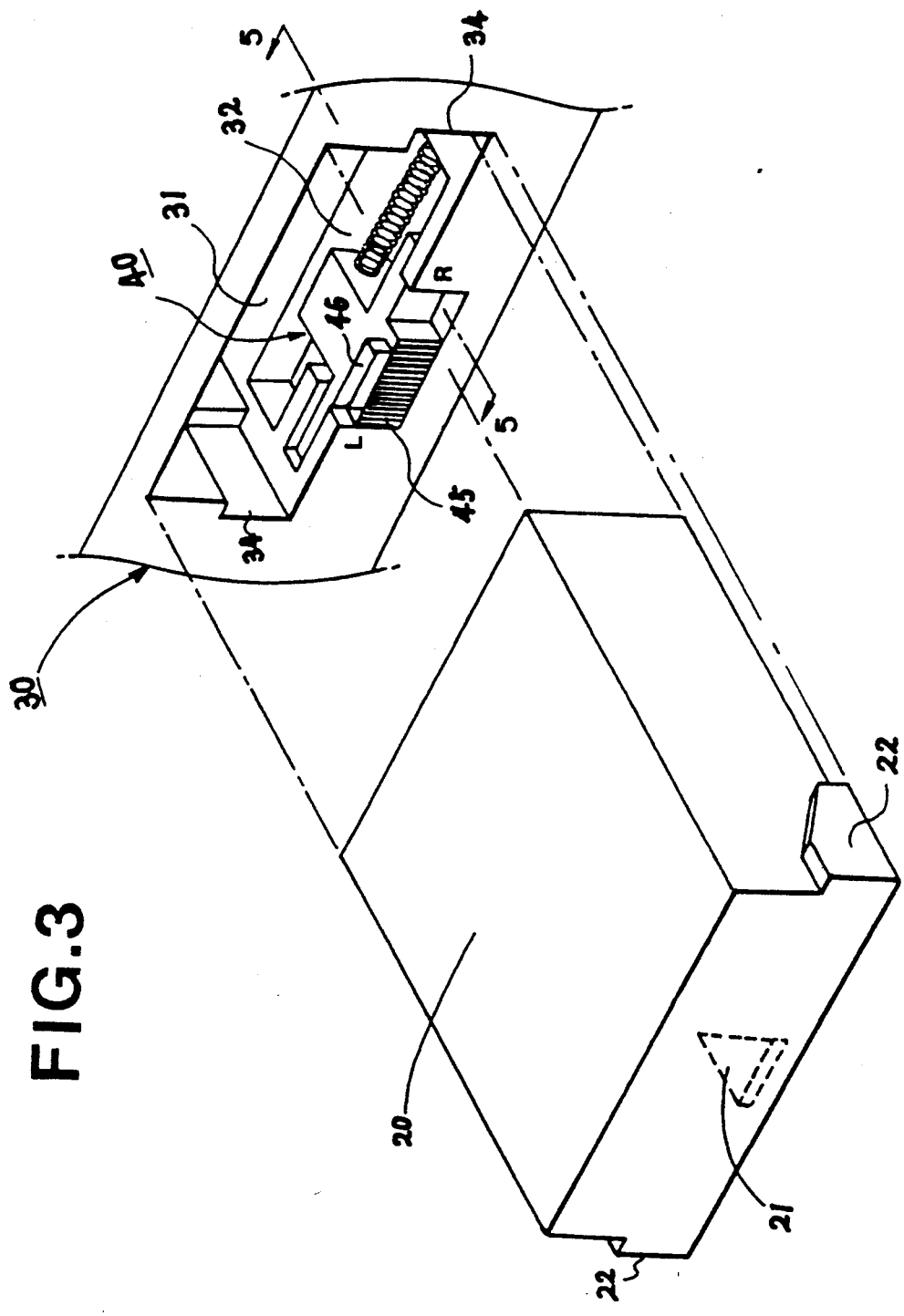
FIG. 3 illustrates the battery locking apparatus provided at the battery receiving portion of the portable PC and the battery housing adapted thereto.
Figure 5:
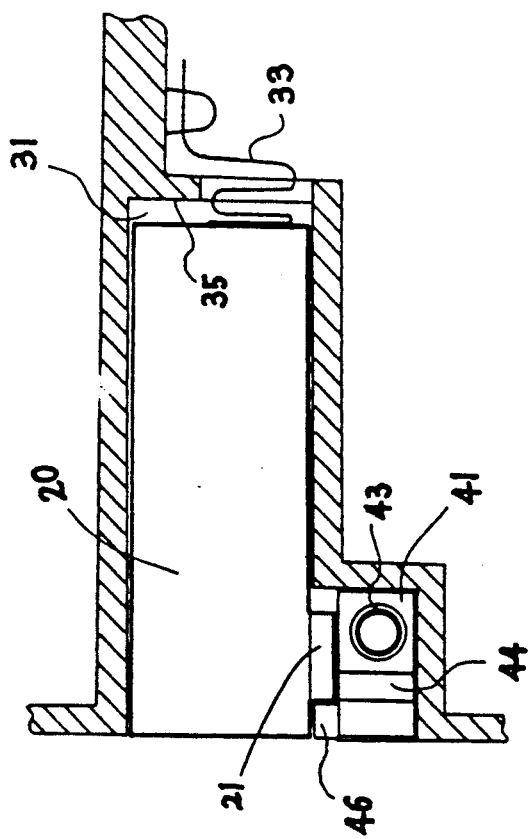
FIG. 5 shows a partial sectional view taken along line 5—5 of FIG. 3 with the battery received in the receiving cavity.
Figure 4:
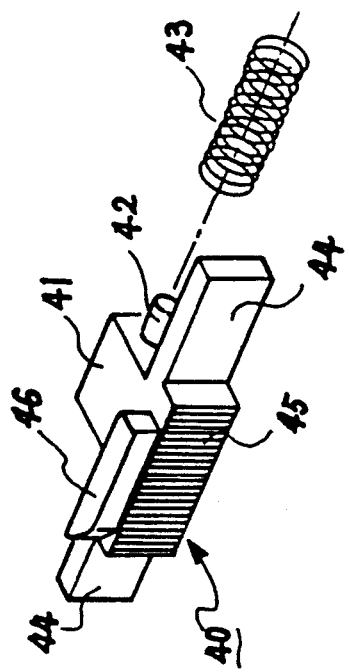
FIG. 4 concretely shows the battery locking means in FIG. 3.

Referring to FIGS. 3 to 5, a battery receiving cavity 31 and a battery locking apparatus according to the invention are provided in the battery receiving portion 30 of the portable PC main body. A channel 32 is formed at the bottom surface adjacent to the entrance of the receiving cavity 31. Also a battery locking means 40 is slidably provided at the channel 32, and a spring 43 is provided in the channal.

As shown in FIG. 4, the locking means 40 comprises a movable body 41 having a strut 42, a knob 45 united therewith. The knob 45 is outwardly exposed so that the user may operate it to move the locking means 40 between the locking and releasing position.

Two supporting members 44 are respectively provided at each side of the body 41 to guide the movement of the locking means 40 as well as to retain the locking means 40 in the channel 32. A protrusion 46 is formed at the top surface of the knob 45 for holding the battery inserted into the receiving cavity 31, of which one edge portion is rounded. Also, a spring 43 is provided in the channel 32 to urge the locking means 40 to the locking position (L). The one end of the spring 43 is supported by the strut 42 of the body 41, while the other end is secured to the opposite wall of the channel 32.

A battery housing 20 containing a battery has a right-angled triangular segment 21 formed at the bottom surface thereof. The top surface of the protrusion 46 is the same level as the bottom surface of the receiving cavity 31, while the top surface of the locking means 40 except the protrusion 46 is lowered so that the segment 21 of the battery housing 20 could be placed thereon when the battery is inserted into the receiving cavity 31 (FIG. 5).

FIGS. 6a and 6b show the cooperating of the locking means 40 with the right-angled triangular segment 21 provided on the bottom surface of the battery housing 20. As the battery is inserted into the cavity 31, the rounded edge portion of protrusion 46 is contacted with the segment 21 of the battery housing 20 and is moved by the oblique side of the segment 21, which causes the locking means 40 to be moved against the force of spring 43 from the locking position (L) to the releasing position (R) allowing the battery to be received in the cavity 31 (FIG. 6a). And when the base of the right-angled segment 21 is passed the protrusion 46, the locking means 40 returns to the original locking position (L) by repulsion force of the spring 43 to lock the battery in the cavity 31 (FIG. 6b).

A pair of grooves 34 are formed at both side walls of the entrance portion of the cavity 31 to receive ribs 22 provided at both sides of the battery housing 20 so that the received battery is held at its position (FIG. 3).

To release the battery from the cavity 31 of the PC main body, the user moves the knob 45 to the releasing position(R) against the force of the spring 43 to cause the segment 21 to be disengaged from the engagement with the protrusion 46. Then, the battery may be resiliently ejected from the cavity 31 by the force of a spring 33 provided at the inmost wall 35 of the cavity to resiliently receive the battery or to release it as shown in FIG. 5. The spring 33 may serve as a terminal.

Having now fully described the present invention, it will be apparent to one of ordinary skill in the art that many changes and modifications can be made thereto without departing from the spirit and scope of the invention as set forth herein.

What is claimed is:

1. A battery locking apparatus for a portable personal computer, comprising a channel formed at a bottom surface of a battery receiving cavity of a PC main body, a battery locking means disposed in the channel to be slidable between the locking and releasing positions, a spring member provided in the channel for the resilient movement of the battery locking means, wherein the battery locking means includes a movable body disposed in the channel, having a strut to support the spring member, an outwardly exposed knob united with the body, a protrusion formed at a top surface of the knob, and a pair of supporting members provided at both sides of the body to retain the locking means in the channel.

2. A battery locking apparatus according to claim 1, wherein said protrusion has a top surface with the same level as the bottom surface of the battery receiving cavity, while the top surface of the locking means except the protrusion is lowered to capture the corresponding portion of a battery housing when a battery is inserted into the battery receiving cavity.

3. A battery housing adapted to the battery locking apparatus as claimed in claim 1, including a right-angled triangular segment formed at the bottom surface thereof, which is adapted to cooperate with a protrusion of the knob of the locking means to move the locking means from a locking position to a releasing position.

* * * * *